May 13, 1952  V. V. WEYANT  2,596,630
SAWING MACHINE

Filed Nov. 13, 1946  8 Sheets-Sheet 1

INVENTOR
VALONE V. WEYANT
BY Oldham &
Oldham
ATTORNEYS

May 13, 1952　　　V. V. WEYANT　　　2,596,630
SAWING MACHINE
Filed Nov. 13, 1946　　　　　　　　　　8 Sheets-Sheet 2
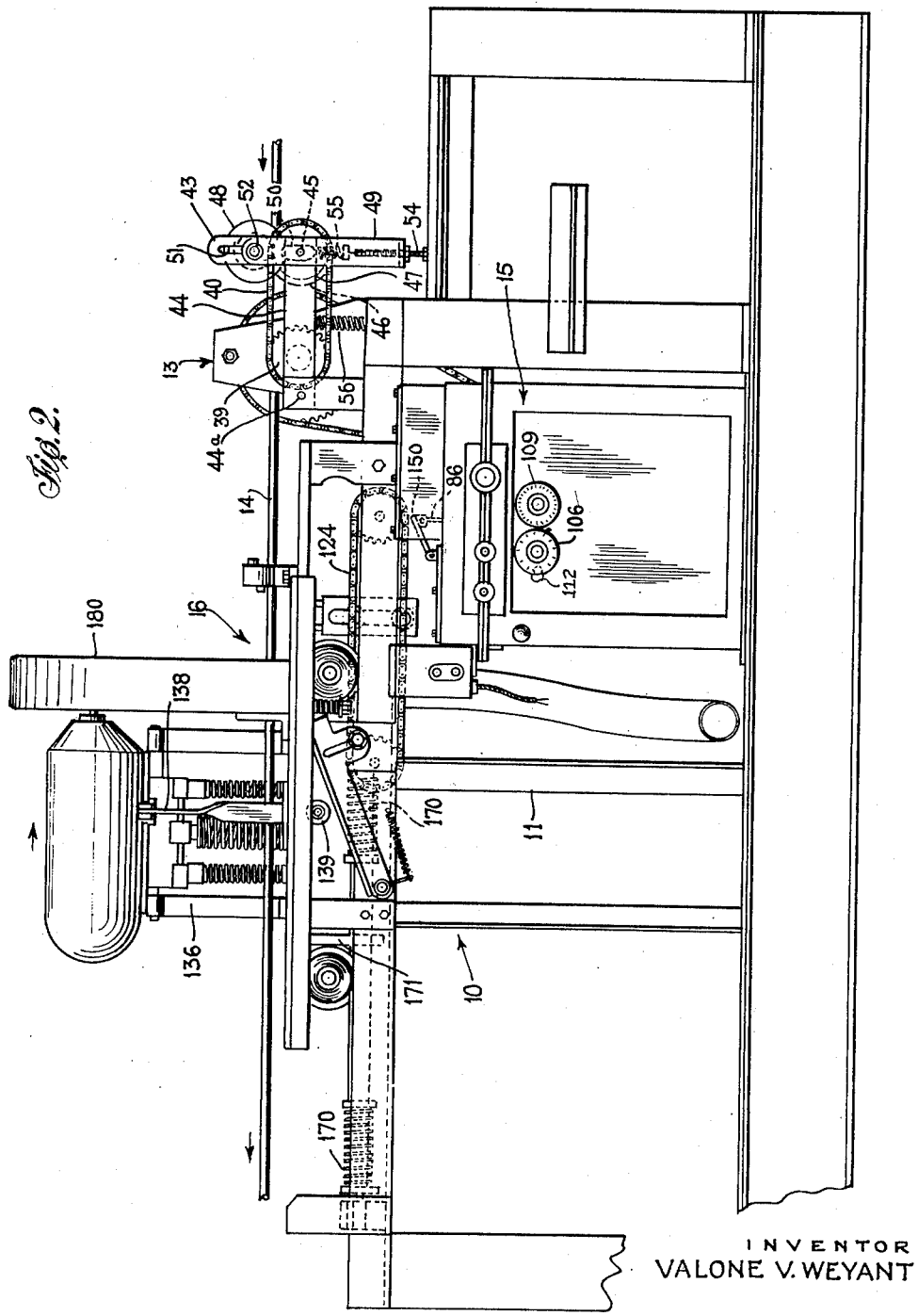
INVENTOR
VALONE V. WEYANT
BY
ATTORNEYS May 13, 1952     V. V. WEYANT     2,596,630
SAWING MACHINE
Filed Nov. 13, 1946     8 Sheets-Sheet 3
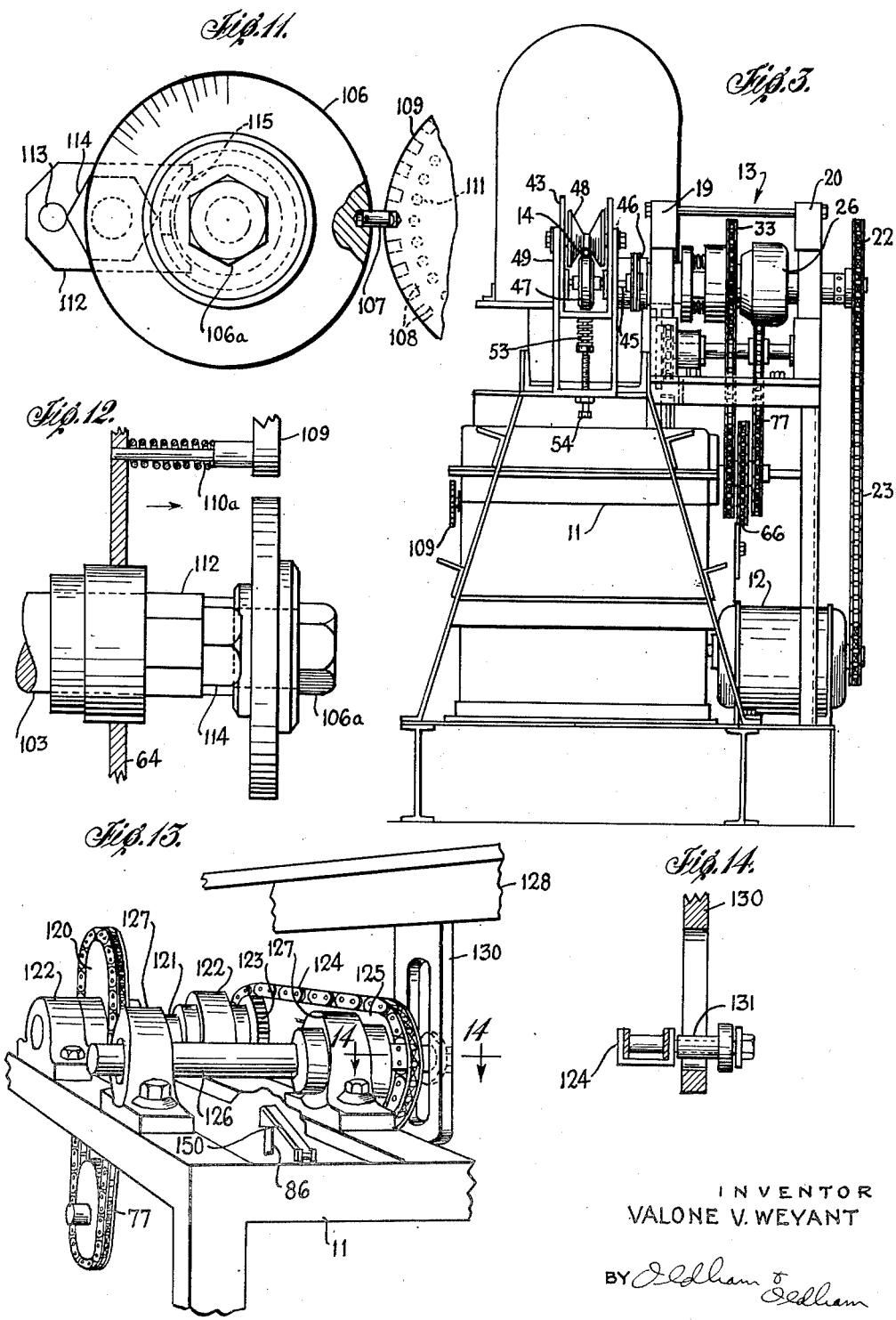
INVENTOR
VALONE V. WEYANT
ATTORNEYS May 13, 1952 V. V. WEYANT 2,596,630
SAWING MACHINE
Filed Nov. 13, 1946 8 Sheets-Sheet 4
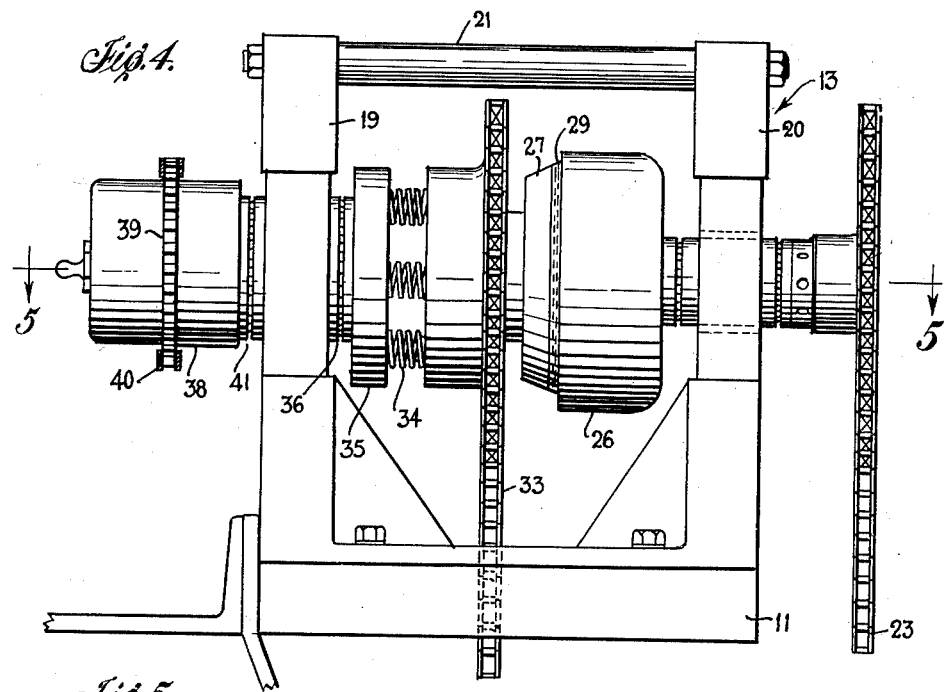
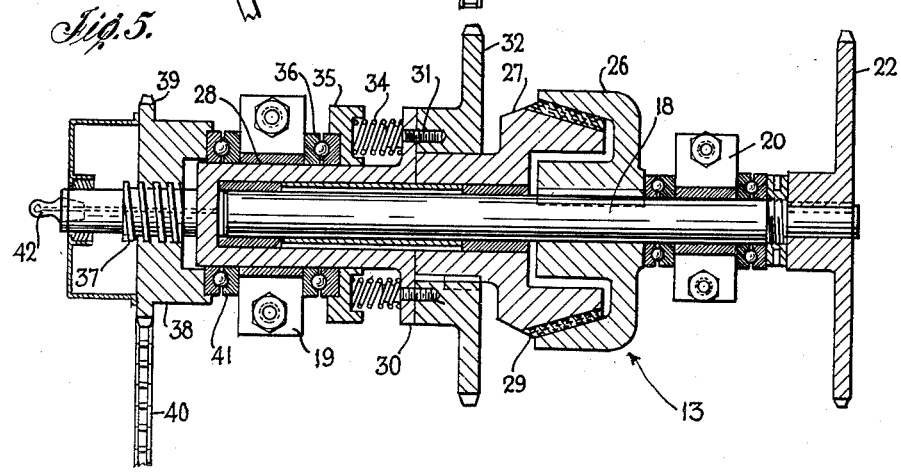
INVENTOR
VALONE V. WEYANT
BY Oldham & Oldham
ATTORNEYS May 13, 1952 V. V. WEYANT 2,596,630
SAWING MACHINE
Filed Nov. 13, 1946 8 Sheets-Sheet 5

INVENTOR
VALONE V. WEYANT

BY *Oldham & Oldham*

ATTORNEYS

May 13, 1952 V. V. WEYANT 2,596,630
SAWING MACHINE

Filed Nov. 13, 1946 8 Sheets—Sheet 6

INVENTOR
VALONE V. WEYANT

BY Oldham &
Oldham
ATTORNEYS

May 13, 1952 V. V. WEYANT 2,596,630
SAWING MACHINE
Filed Nov. 13, 1946 8 Sheets-Sheet 7
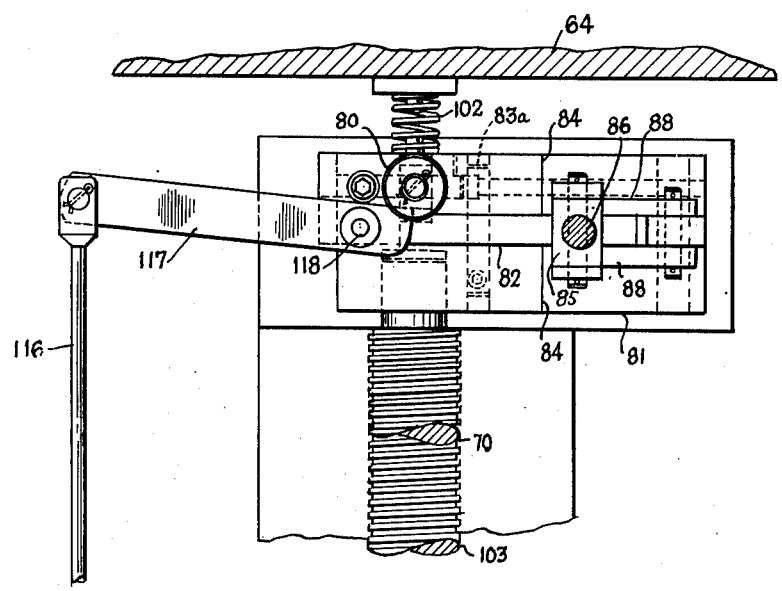
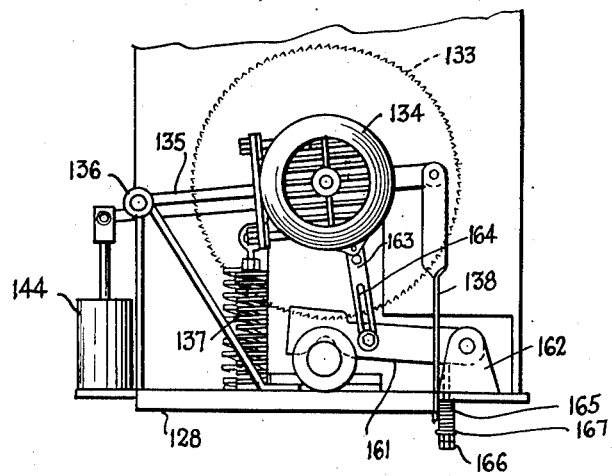
INVENTOR
VALONE V. WEYANT
BY Oldham Tedham
ATTORNEYS

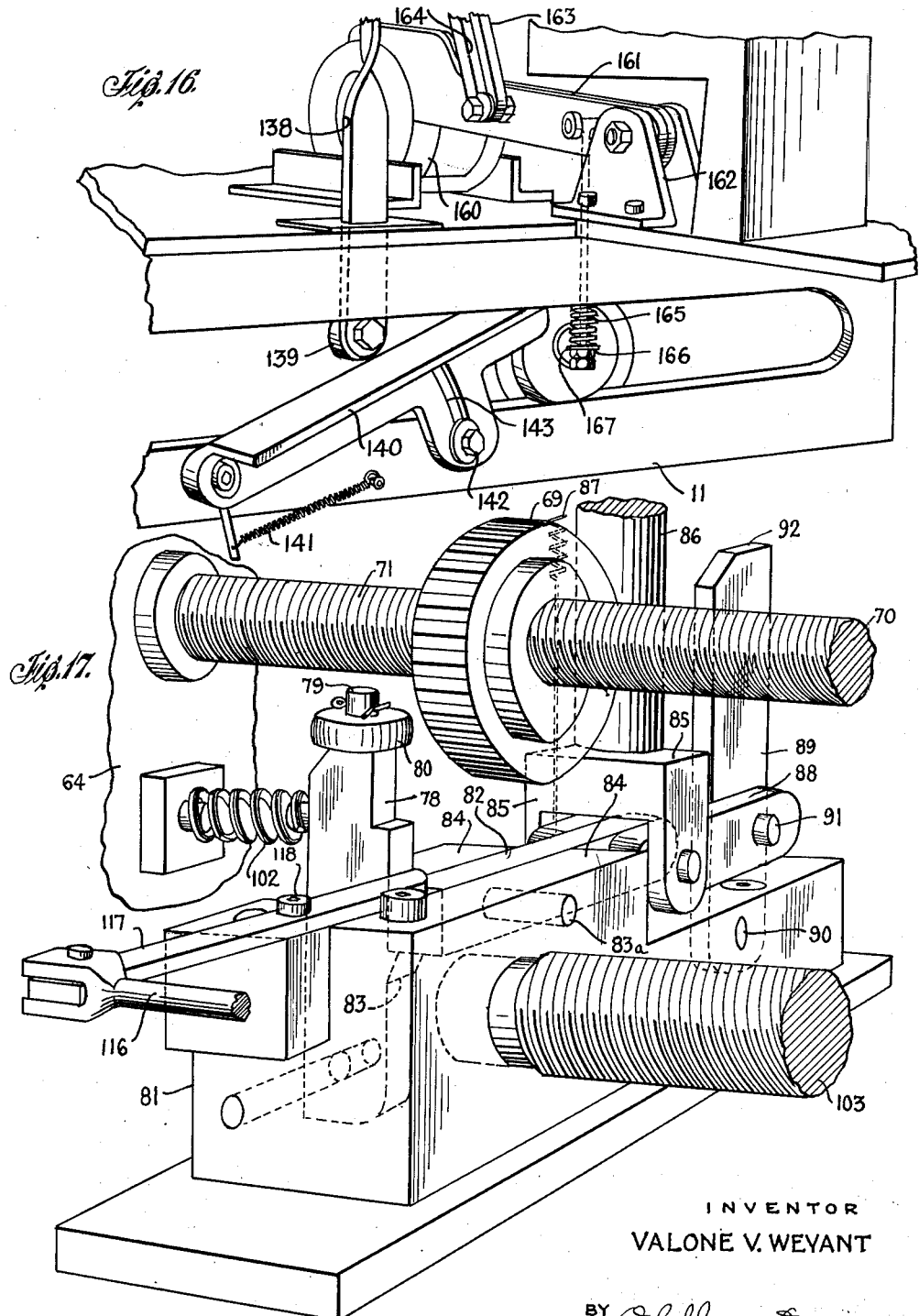

Patented May 13, 1952

2,596,630

UNITED STATES PATENT OFFICE 2,596,630

SAWING MACHINE

Valone V. Weyant, Cleveland, Ohio, assignor to The Yoder Co., Cleveland, Ohio, a corporation of Ohio Application November 13, 1946, Serial No. 709,578

12 Claims. (Cl. 29—69)

This invention relates to automatic functional devices, especially to devices for performing a repetitive operation, such as cutting or marking, on a continuous, moving length of an article such as pipe, rod, or sheet.

Heretofore, various types of apparatus has been provided for automatically performing cyclic operations on a continuous, moving article. One illustration of such apparatus is an automatic cut-off that is used to sever a continuous moving pipe into sections of a predetermined length, as the pipe moves from its forming machine.

However, such cut-off machines have been quite heavy and bulky in many instances and have been difficult to regulate to obtain cuts at proper intervals so as to obtain even length pieces. The weight of the devices also made it difficult to synchronize the movement of the cutter means with that of the pipe. Some cutters also are objectionable because they may fail to operate if the pipe is slightly out of true or because they take power from the moving pipe for their actuation.

The general object of this invention is to avoid and overcome the foregoing and other disadvantages of and objections to known types of automatic functional devices and to provide such a device that is characterized by its accurate and positive operation without use of power from the material to be operated upon.

Another object of the invention is to provide a compact, sturdy machine adapted to function for continuous periods with a minimum of maintenance.

Another object of the invention is to provide an automatic functional device which is entirely operated by mechanical elements.

A further object of the invention is to provide an automatic functional device with a movable operational carriage that is synchronized with the moving article before the means on the carriage operate regardless of the speed of movement of the article.

Yet another object of the invention is to provide an effective, accurate means for use in measuring repetitive lengths of a continuous article.

Further and more limited objects of the invention are to provide an automatic processing machine adapted to handle a variety of sizes of articles; to secure the articles in position when they are being acted upon; to provide a finely calibrated, easily operated adjustment for varying the length of the article passing the machine for actuating same; to make the machine adjustable as to the length of article required to function the machine and to make it adjustable while the machine is operating; to provide a movable carriage that has a cyclic action and which is automatically locked in inoperative position on completion of an operational cycle; to provide a measuring roll which moves only with the article being functioned upon by the machine; to provide novel controls for the drive of the operative carriage member of the machine; to provide an improved drive member for the carriage; to provide a manual control for actuating the carriage, and to operate even if the article is out of line.

The foregoing, and other objects and advantages of the invention, are achieved, broadly speaking, by the provision of a frame, a synchronizing device for controlling operation of the machine in accordance with movement of the article being processed, a carriage carried by the frame for movement therealong, a measuring device for recording movement of the article and driving the carriage device at predetermined intervals, and means carried by the carriage device for performing a desired operation on the article being processed when the carriage is actuated.

Reference now is made to the accompanying drawings, wherein:

Fig. 2 is a front elevation of the machine of Fig. 1;

Fig. 3 is a right end elevation of the machine of Fig. 1;

Fig. 4 is a fragmentary enlarged elevation of the synchronizing means of the invention;

Fig. 5 is a horizontal section on line 5—5 of Fig. 4;

Fig. 10 is a plan of the device of Fig. 8;

Fig. 11 is a fragmentary elevation of the indicator means of the invention;

Fig. 12 is a side elevation of the means of Fig. 11;

Fig. 13 is a perspective of the carriage drive of the invention;

Fig. 14 is a horizontal section of line 14—14 of Fig. 13;

Fig. 15 is a fragmentary rear elevation of the saw driving motor and associated means;

Fig. 16 is a fragmentary perspective of the saw motion control means; and

Fig. 17 is a perspective view of the clutch re-release device shown in Fig. 8.

Figure 1:
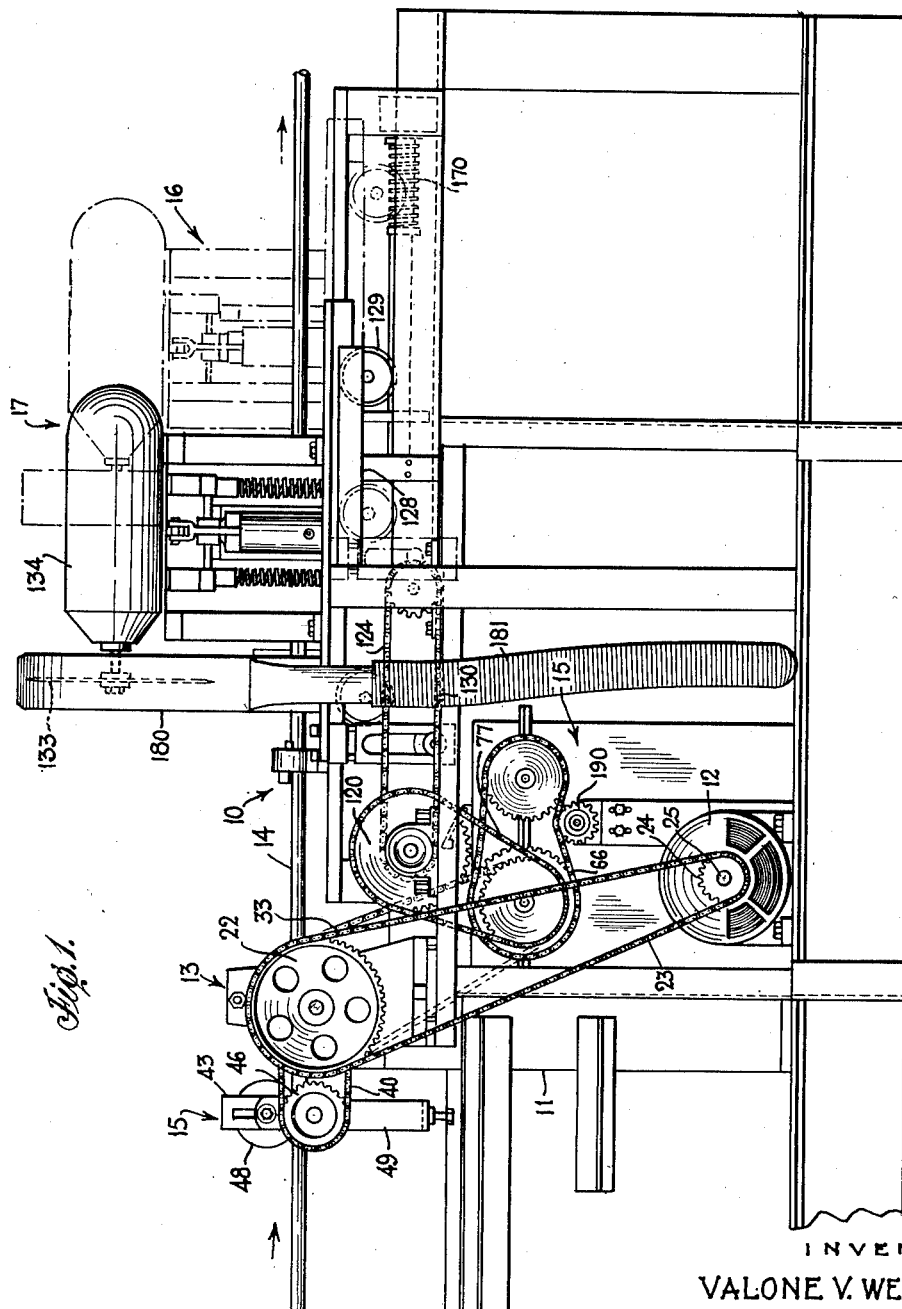
Fig. 1 is a rear elevation of a pipe-cutting machine embodying the principles of my invention.

A detailed description of the automatic pipe cutter chosen to illustrate the principles of the invention, and which is shown in the drawings, will be presented now and the pipe cutter is indicated generally by the numeral 10. The machine 10 of the invention includes a frame 11 which may have a drive element, as an electric motor 12, mounted thereon. The motor 12 is connected to a synchronizing device, generally indicated at 13, that is adapted to synchronize the operation of a measuring device, generally indicated by the numeral 15, with the movement of a pipe 14 so that the measuring device 15 will occasion movement of a carriage 16 at desired intervals with relation to the movement of the pipe 14. The carriage 16 mounts a cut-off saw, indicated generally at 17, that automatically severs the pipe 14 upon movement of the carriage 16 by the measuring device 15, as will hereinafter be more completely explained.

Synchronizing device

The purpose of the synchronizing device is to synchronize, constantly, the operation of the measuring device 15 with the speed of the pipe 14. To this end, a shaft 18 (Figs. 4 and 5) is suitably journalled in a spaced pair of brackets, or housings 19 and 20 that are carried by the frame 11 and connected at their upper ends by a tie bar 21. The shaft 18 is constantly driven by a sprocket 22 suitably secured to one end thereof and engaged with a chain 23 that is engaged with and driven by a drive sprocket 24 on the shaft 25 of the motor 12. The shaft 18 carries the cup section 26 of a frictional cone clutch the cone section 27 of which is suitably secured to a sleeve 28. Conventional friction material 29 is secured to one of the adjacent conical faces of the clutch sections 26 and 27.

A primary feature of the invention is that the two elements whose movements are to be synchronized, in this instance that of the pipe 14 and the measuring device 15, are both associated with the sleeve 28. Thus a flange 30 may be formed integrally with the sleeve 28 at the end thereof adjacent the cone clutch section 27 and cap screws 31 secure a sprocket gear 32 to the flange. A chain 33 connects this gear 32 to the measuring device 15, as explained hereinafter. It will be noted that the sleeve 28, in its connection to the pipe 14, exerts a driving force on the pipe and does not take energy from the pipe in measuring its movement.

The gear 32 and the cone clutch section 27 are urged axially of the shaft 18 by a plurality of coil springs 34 that bear on the flange 30. These springs 34 are backed by a disc 35 which is suitably secured to the sleeve 28 and rotates therewith. A conventional thrust roller bearing 36 or other similar means separates the disc 35 from the housing 19 so that the housing serves as a base or limit member with relation to movement of the clutch section 27.

For engagement with means controlled by the pipe 14 and to control the engagement of the clutch sections 26 and 27, the sleeve 28 has a threaded stud 37 fixedly associated therewith and extending axially from the end thereof remote from the flanged end of same. The control means, such as a hub nut 38, is engaged with the stud 37 and it has a sprocket 39 formed integrally with or secured to its periphery, which sprocket has a chain 40 engaged therewith. As shown in Fig. 5, the inner edge of the nut 38 bears against a suitable thrust bearing 41 which in turn bears against the outer side of the housing 19 and is held against lateral movement thereby. A grease fitting 42 is secured to the end of the stud 37 and it connects to a point within the sleeve 28 to lubricate the shaft 18.

In operation, the shaft 18 is driven at a speed higher than that ever desired for the sleeve 28 so that there is always some slip between the clutch sections. The nut 38 serves to control the axial force bringing the clutch sections into engagement by moving the sleeve 28 axially with relation to the shaft 18, and thus regulate the amount of clutch slip. While the nut 38 is free with relation to the stud 37, it still will rotate therewith and serve to transmit slight force therethrough, since the pitch of the threads is made great enough to set up sufficient friction for this purpose. As later explained in detail, the gear or sprocket 39 is connected to the pipe 14 so as to indicate movement thereof. Thus the rotation of the sprocket 39 is a measurement of the pipe's motion and, if the pipe moves faster than the sleeve 28, the nut 38 will be moved with relation to the stud 37 towards the outer end of the stud. Since the nut 38 is the member limiting the movement of the clutch cone 27 towards the clutch cup by action of the springs 34, such greater speed of the nut 38 will advance the nut on the stud and free the sleeve 28 and its associated means for axial movement towards the clutch cup 26. The springs 34 will force the clutch cone 27 more tightly into engagement with the clutch cup 26 as soon as the movement of the nut 38 frees the sleeve for such action. This will, of course, give better engagement of the clutch sections so that the clutch cone 27 and hence the sprocket 32 will be driven at a greater speed to bring them up to the speed of the pipe 14, as the nut 38 will continue to advance on the stud 37 until the speed of rotation of the sleeve 28 and associated means is up to the speed of the pipe.

Then, should the contrary be true and the speed of the sprocket 32 be greater than that of the sprocket 39, the stud 37 will be turned into the nut 38 whereby the nut will serve to draw the clutch cone 27 out of engagement with the clutch cup 26 and the speed of drive of the sleeve 28 and associated means will be automatically reduced. Hence the sprockets 32 and 39 are automatically adjusted by mechanical means alone to operate at the same angular velocities and the linear speeds of same can be adjusted by predetermined calculations as to their sizes with relation to the remainder of the apparatus, the operation of which is to be synchronized by the machine of the invention. It will be seen that this action of the stud 37 and nut 39 is very rapid and that only a very short relative movement is required to change the clutch engagement.

Article engaging means

A further novel feature of the apparatus is that a U-shaped bracket 43, best shown in Fig. 3, is secured to the frame 11 by a pair of pivotally mounted arms 44 which are pivotally secured to the frame at 44a and which extend substantially horizontally therefrom towards the origin on the pipe 14. These arms 44 are adapted to support floating rollers which can be positioned to receive a variety of pipe sizes therebetween. This bracket 43 suitably journals a shaft 45 therein that extends beyond one side thereof and mounts a sprocket 46. The sprocket 46 in turn engages with the chain 40 of the synchronizing device 13 and receives a limited driving force therefrom. Thus a thin cylindrical roller 47, carried by the shaft 45 between the arms of bracket 43, contacts the pipe 14 and is at least partly driven by the synchronizing device 13. It is thought that the roller 47 will not withdraw energy from the pipe 14 but will be pressed against it so that movement of the roller's periphery will measure longitudinal movement of the pipe and will exert a slight tensional pull thereon. Then the apparatus is able to handle a variety of sized articles by providing, opposite the roller 47, a deeply recessed roller 48 which is journalled on a shaft 52 carried by a second U-shaped bracket 49 that telescopes over the bracket 43 from the lower end thereof. The bracket 49 has a slot 50 formed in at least one arm thereof and the shaft 45 extends through the slot 50 to assist in retaining the brackets 43 and 49 in association. A slot 51 is formed in the upper end of each arm of the bracket 43 and the shaft 52 extends through such slots whereby the brackets 43 and 49 are retained in slidable, vertical alignment.

To regulate the position of the roller 48 with relation to the roller 47, a spring 53 is suitably carried by the lower surface of the base of the bracket 43 and it is engaged by an adjustable screw 54 so that the roller 48 can be moved to adapt the rollers 47 and 48 to receive a variety of sized articles therebetween. In all events the screw 54 is to be set so as to cause the rollers 47 and 48 to grip the article therebetween so that no relative slippage occurs. Thus the roller 47, through the chain 40 and sprocket 39, records the true movement of the pipe 14 through the apparatus of the invention. A coil spring 56 is positioned between the arms 44 and the frame 11 to support the article engaging apparatus and to permit it to move slightly with slight vertical variations in the longitudinal axis of the pipe 14. The shafts 45 and 52 are also free to move laterally slightly to accommodate lateral deviations in the axis of the pipe 14.

Measuring device

Figure 6:
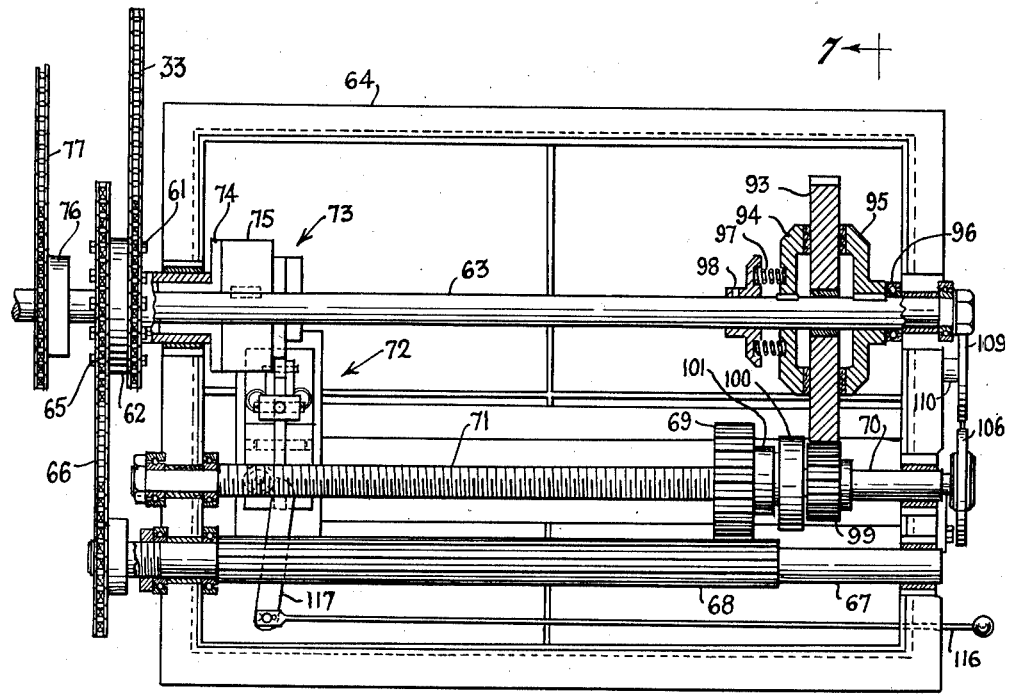
Fig. 6 is a plan, partly in section, of the gear box with its cover removed.
Figure 7:
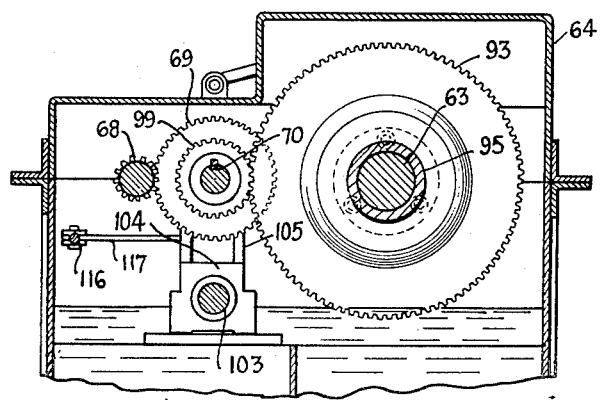
Fig. 7 is a vertical section on line 7—7 of Fig. 6.

Having reference to Fig. 6, the chain 33 from the synchronizing device transmits drive to a sprocket 61 that is suitably secured to a hub bushing 62 which is journalled on a clutch shaft 63 which, in turn, is journalled adjacent its ends, in a conventional manner, by a gear box, or housing 64. The gear box 64 is carried on the frame 11 and receives the measuring means therein. A sprocket 65 is also secured to the hub bushing 62 and it engages with a chain 66 that is connected to a sprocket that is carried by a pinion shaft 67 which is journalled at its ends in the gear box 64. From the foregoing, it will be seen that the chain 33 from the synchronizing device moves at least proportionally to the speed of the pipe 14 and that the shaft 67 will be rotated whenever the pipe is moving. The shaft 67 has a pinion gear 68 formed thereon for substantially its entire length and such gear 68 engages with a gear nut 69 that is carried by a control shaft 70 which is suitably journalled in the gear box 64. The shaft 70 has threads 71 cut thereon which engage with threads (not shown) tapped into the bore of the gear nut 69. Thus the gear nut 69 will be rotated by the pinion gear 68 and such rotation will normally advance the gear nut along the shaft 70 from the right to the left. (Fig. 6.)

The gear nut 69 then is adapted to engage with and actuate lock means 72 that in turn control operation of a single revolution type clutch, indicated generally at 73, which clutch is carried by the shaft 63. The driving section 74 of the clutch 73 is secured to the hub bushing 62 while the other, or driven clutch section 75 is secured to the clutch shaft 63. Hence when the clutch 73 is engaged, the shaft 63 is driven by the chain 33 and a sprocket 76, carried by the shaft 63 at its end, engages with a chain 77 to transmit drive to the carriage unit 16.

The aforementioned action all is controlled by the gear nut 69 and its actuation of the lock means 72. This novel lock of the invention (shown in Figs. 8, 9, 10 and 17) comprises a vertically extending latch hook 78 that has a pin 79 extending upwardly from its upper end and which journals a roller 80 thereon. The latch hook 78 is pivotally carried by a block 81 which is secured to the gear box 64. The roller 80 is in the path of the gear nut 69 as it approaches the end of the shaft 70 and the gear nut 69 will force the latch hook 78 to pivot towards the adjacent wall of the gear box, which compresses spring 102. A feature of the invention is that the spring 102 is of a comparatively high pressure type so that a substantial force is required to move latch hook 78. The force required is sufficient to "take up" any slack or lost motion which may be present between the many parts of the measuring device. This provides a means of automatically compensating for any looseness between the moving parts caused by and incident to wear. Further movement of the gear nut releases a clutch tripping latch 82 that normally is supported by a narrow shoulder 83 formed on the latch hook. The clutch tripping latch 82 is pivotally supported intermediate its ends on a pin 83a that is journalled between a pair of spaced upwardly directed shoulders 84 formed on the block 81. The free end of the clutch tripping latch 82 is in turn pivotally secured to a clevis 85 which is carried by a reset rod 86 which is positioned in the gear box for limited vertical movement as will hereinafter be explained. A spring 87 is secured to the clevis 85 in a conventional manner and it is also secured (not shown) to the upper part of the gear box 64 so that the reset rod 86 will automatically move upwardly of the gear box when the clutch tripping latch 82 is released from the latch hook 78.

Figure 9:
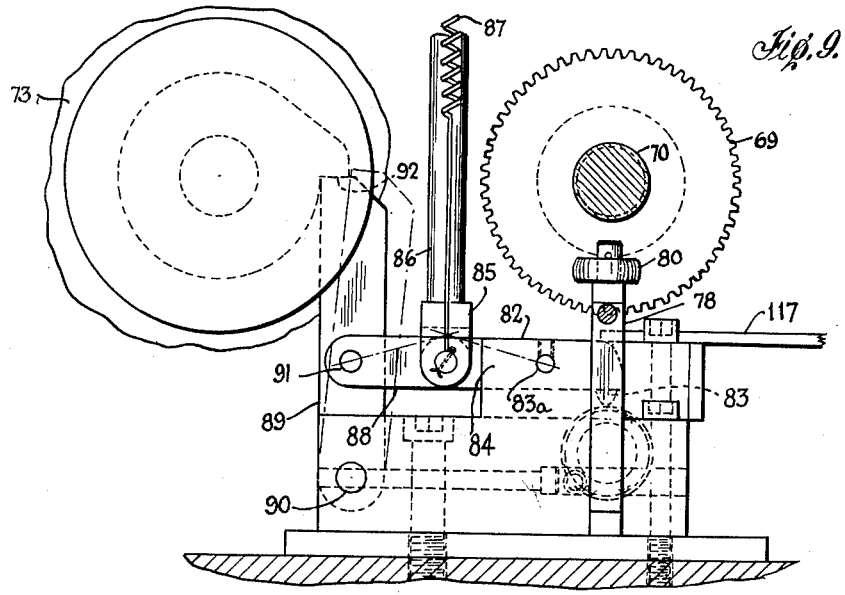
Fig. 9 is a side elevation of the device of Fig. 8.
Figure 8:
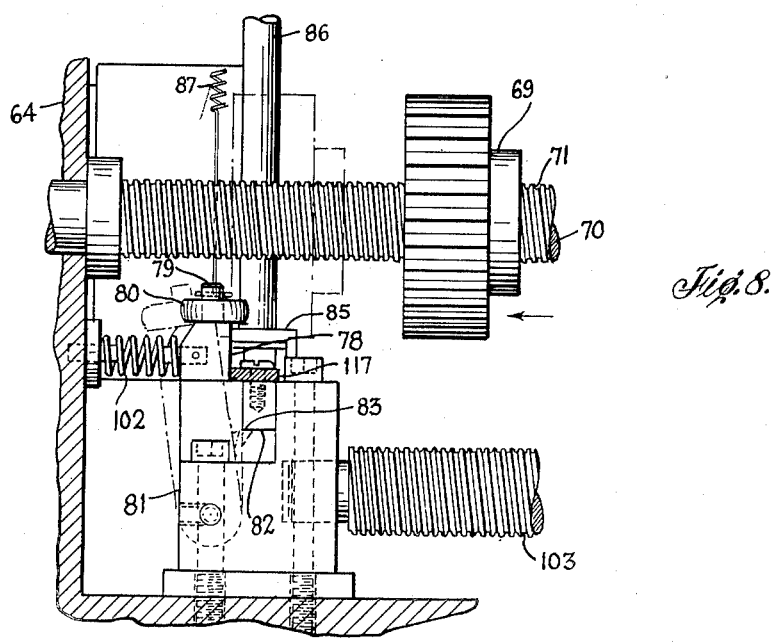
Fig. 8 is a detail elevation of the clutch release device of the invention with the gear nut advanced.

To control the action of the clutch 73, the clevis 85 also connects to a pair of links 88 that connect to a clutch tripping dog 89 which is pivotally carried by a pin 90 journalled in the block 81. A pin 91 pivotally connects end of the links 88 to the clutch tripping dog 89 intermediate its ends, as shown in Fig. 9. The clutch 73 is of conventional construction and is of the type adapted to be operated by an external control. Thus the clutch 73 has a shoulder 92 formed thereon which engages or disengages the clutch dependent upon whether or not the shoulder 92 is free to move, or is held against motion, respectively. The dog 89 normally is engaged with the shoulder 92 but the upward movement of the reset rod 86 will move the dog 89 about an arc centered on the pin 90 and will connect the clutch 73 to cause the shaft 63 to drive the chain 77.

The measuring means of the invention are reset by use of a gear 93 that is rotatably journalled on the shaft 63. Conventional clutch plates 94 and 95 are secured to the shaft 63 and are positioned on opposite sides of the gear 93 with the plate 95 being held against lateral movement by a bearing 96 between it and the gear box 64 and with a plurality of coil springs 97 being compressed between a collar 98, secured to the shaft 63, and the clutch plate 94. The plates 94 and 95 have conventional clutch facings, preferably of metal, thereon so that they will releasably drive the gear 93 whenever the shaft 63 rotates. The gear 93 is of relatively large diameter, as shown, and it engages a relatively small diameter gear 99 which is secured to the shaft 70. A stop member 10 is positioned about the shaft 70 intermediate the gear nut 69 and the gear 99 and a suitable thrust bearing 101 is positioned between the stop 100 and gear nut 69. Thus when the shaft 63 rotates, the gear 93 is so designed and arranged as to drive the gear 99, and hence the shaft 70, in a direction and at such a greater speed than the pinion gear 68 is driving the gear nut 69, that the gear nut 69 is brought back to bear against the stop member 100, due to the threaded engagement of the gear nut 69 and shaft 70. This frees the lock means 72 for resetting which is effected by downward movement, as hereinafter explained, of the reset rod 86 that in turn causes the lock end of the clutch tripping latch 82 to move above the shoulder 83 on the latch hook 78. As indicated, the compression spring 102 is secured between the gear box 64 and the free end of the latch hook. The spring 102 also urges the latch hook 78 back to latch position whenever the clutch tripping latch 82 is moved as to permit lock action by the latch hook 78.

In returning the gear nut 69 to its starting position wherein it is abutted on the stop member 100, the gear 93 first moves at least at substantially the same rotational speed as the shaft 63 and this effects a rapid relocation of the gear nut. To retain the gear nut 69 at its zero position, the gear 93 slips appreciably with relation to shaft 63 but the clutch plates 94 and 95 are urged into engagement with the gear 93 so as to rotate it and thereby the shaft 70 at a sufficient speed that the gear nut 69 will be retained against the stop 100 against the action of the threads 71 and pinion gear 68 which attempts to move the gear nut towards the left on the shaft 70 even during the reset action.

Yet another feature of the invention is that the stop member 100 can be moved along and retained at a given spot on the shaft 70 to cause the measuring device to operate for different lengths of the pipe 14. For this function, a threaded shaft 103 is journalled in the gear box 64 and block 91 below the shaft 70 and a nut block 104 is engaged with the shaft 103. This nut block 104 carries the stop member 100 by a pair of bars 105 secured therebetween. Thus as the nut block 104 is moved along the shaft 103 by rotation thereof, the stop member 100 is correspondingly moved along the shaft 70 to limit axial movement of the gear nut 69 along the shaft 70.

Preferably, indicator means (shown in Figs. 11 and 12) are provided to correlate the position of the nut block and stop member with the input motion of the pipe required to move the gear nut 69 from its zero to its lock release position. These means are shown as an inch indicator dial 106 that is carried by the shaft 103 at an end thereof that protrudes through the gear box 64.

The dial 106 carries a dial engaging pin 107 that extends radially from an edge thereof and engages with one of a number of radially directed recesses 108 formed in the edge of a second, or foot indicator dial 109 that is secured to a stub shaft 110 journalled in the gear box 64. The pin 107 is adapted to move the dial 109 through such an arc that the pin will engage the next adjacent recess 108 each time the dial 106 is revolved so that the dial 109 will in turn be moved through one step or arc of a circle. A lock pin 110a may be resiliently urged against and engage with recesses 111 in the rear face of the dial 109 to retain it in a given position.

Then, by suitably calibrating the dials 106 and 109, the stop member 100 can be set to cause the measuring device to function for any desired length of material passing the machine of the invention, within the limits of the apparatus. In this instance, one rotation of the dial 106 equals one foot of material and each notch or recess 108 equals one foot of material passing the machine.

The dial 106 preferably is locked in a given position and a clamp dog 112 is pivotally secured to the gear box 64 by a pin 113 for this purpose. A stud 114 extends through the clamp dog 112 and engages the gear box 64 so that when the stud is tightened, a curved free end 115 of the dog frictionally engages with the shaft 103 to prevent it from turning. Loosening the stud 114 permits the shaft 103 and dials to be turned to set the measuring device.

It should be noted that the dials 106 and 109 and hence the setting of the machine can be changed when the machine is in operation and that no parts can be jammed or injured by such resetting. Also, the dial 106 is adjustably held on the shaft 70 by a clamping stud 106a so that the machine can be accurately calibrated both initially and as wear occurs.

Another desirable feature of the invention is that the measuring device can be actuated at any desired time by hand. A lever 116 connects to a link 117 that is pivotally supported intermediate its ends by a pin 118 that is secured to the block 81. The link 117 then is designed to move the latch hook 78 out of engagement with the clutch tripping latch 82 when the end of the lever 116, extending out beyond the gear box, is pulled outwardly.

*Carriage mechanism*

The chain 77, which is the output, or driven member of the measuring device, connects to a sprocket 120 that is secured to a stub shaft 121 journalled in housings 122 suitably secured to the frame 11. The shaft 121 extends transversely of the frame 11 and mounts a sprocket 123 adjacent the carriage unit, which sprocket 123 engages with and drives a chain 124 that in turn engages a sprocket 125 that is carried by an idler shaft 126. The shaft 126 is journalled in housings 127 on the frame 11 and the shafts 121 and 126 are spaced longitudinally of the machine to define the length of movement of the carriage unit, as shown in Fig. 13.

The carriage unit 16 includes a table 128 that is supported on the frame 11 by rollers 129 at each end of the table. Drive is transmitted to the table 128 by a yoke 130 which is secured thereto and extends downwardly therefrom. A roller 131 that is journalled on a pin 132, which is secured to the chain 124 and extends laterally therefrom, engages the yoke 130. This roller 131, as shown in Fig. 14, is on the axis of the chain 124 to facilitate transmittal of energy therethrough and the roller 131 is free for appreciable vertical movement in the yoke 130 so that as the roller 131 passes through the oval orbit of the chain 124 the carriage table 128 is reciprocated through a predetermined distance on the frame 11. Such motion occurs, of course, only when the chain 77 is being driven by the measuring device which usually is at intermittent periods, but could be continuously when the device is set on its shortest length cycle, which length equals the time required for an amount of the pipe 14 equal to the length of the chain 124 to pass the machine 10. It will be seen that the various sprockets and gears used in connecting the apparatus are so correlated that the speed of movement of the table 128 equals the speed of the pipe 14.

To sever the pipe 14, conventional means, such as a circular saw or disc cutter 133 (Fig. 15) is provided on the shaft of a continuously running conventional electric motor 134 that is supported by arms 135 which are pivotally secured to a bracket 136 extending upwardly from the table 128. Coil springs 137 are compressed between the arms 135 and table 128 to urge the motor 134 normally to its upper-most position. The motor 134 has a connector bar 138 pivotally secured to and extending downwardly from it, which bar 138 extends through a slot (not shown) in the table 128 and carries a roller 139 at its lower end. The roller 139 then controls the cutting operation of the saw 133 by engaging with an angle track 140 which is pivotally secured at one end to the frame 11 under the table 128. The angle track 140 is urged to an inclined position, with its front end being appreciably higher than its rear end, by a spring 141. A stud 142 may engage with a slot 143 formed in the track 140 to limit its movement. Thus on forward movement of the carriage unit (which is taken to be movement along with the pipe), the roller 139 will engage the front end of the track 140 and draw the saw 133 downwardly as the table moves forward. The roller 139 will be moved beyond the rear end of the track 140 and be disengaged therefrom by the springs 137 that will snap the motor 134 and its associated means up to their normal inoperative positions. The movement of the saw 133 has, naturally, been across the axis of the pipe to cut it into the predetermined length desired. One or more dash pots 144 may be connected to the arms 135 to snub the return of same.

Fig. 13 shows a control arm 150 which is pivotally secured to the top of the gear box 64 adjacent the shaft 121. The arm 150 is upwardly inclined and, at its front end, engages with the reset rod 86. The arm 150 is positioned in the orbit of the roller 131, so that the roller 131 in being driven through an operational cycle, will strike the arm 150 and depress it. Then the reset rod 86 will position the clutch dog 89 to disengage the clutch 73 and this will automatically stop the drive of the carriage unit on completion of its cycle of operation. When the clutch 73 is disengaged, the shaft 63 and gear 93 will no longer be driven so that the pinion gear 68 will cause the gear nut to move from right to left (Fig. 6) when the shaft 67 is rotated.

The table 128 positions a pair of apertured annular members 160 with the pipe 14 being adapted to pass through such members and with the saw 133 being positioned to move between the members to sever the pipe. Then a better cut is obtained by use of clamping arms or yokes 161 that are pivotally secured in brackets 162 on the table 128. The clamping arms 161 are pivotally secured to an arm 163 that extends down from and is secured to the motor 134. A slot 164 is provided in the arm 163 so that lost motion may occur between the arms 161 and 163 after the arm 161 engages with the upper surface of the pipe. A spring 165 resiliently draws the clamping arm 161 downwardly of the table by a link 166 connected to such arm and extending down through the table. The spring 165 is compressed between a washer 167 on the link 166 and the under surface of the table 128.

It usually is desirable to have means for cushioning the table at the end of its stroke and which in turn aid in the reversal of motion of the table 128. To this end, coil springs 170 are suitably secured to the frame 11 at the extremities of movement of the carriage 14 and a bracket 171 extends down from the table to engage with the springs 170 and compress them slightly at the last portion of the movement of the table.

A guard 180 is provided around the saw 133 and it has a saw dust collector tube 181 extending therefrom.

An adjustable idler sprocket 190 may be engaged with the chain 66 to retain it taut, if necessary.

*Operation*

While the operation of the machine of the invention should be clear from the foregoing description, it will be outlined again for clarity. The motor 12 drives a shaft 18 which connects to the pipe 14 and the drive chain 33 for the hub 62 and shaft 67 of the measuring device. Movement of the pipe 14 is recorded and accumulated on the shaft 70 by the movement of the gear nut 69 from a point against the stop 100 to a point where it trips the lock means 72 and engages the clutch 73. The clutch then causes the shaft 63 to be driven, when the pipe 14 is moving, to drive the carriage 16 at the same speed as the pipe. The saw 133 is then actuated at a fixed point in the cyclic movement of the carriage and the gear nut 69 and associated means are then automatically reset by the control arm 150 and gear 93 whereby the machine is ready for another operative cycle.

It should be noted that the gear nut 69 and associated means cannot cause the machine to operate on smaller length pieces of material than the circumference of the chain 124 which is equal to the total length of movement of the carriage. The gear nut 69 does not measure less than such distance of movement of the pipe but can cause automatic functioning for any desired greater length of material.

It has been previously indicated that the machine disclosed in detail herein is but one example of the principles of my invention and the machine could operate upon rod, tubing, sheet or other continuous, continually moving articles and any of a number of operations, such as cutting, notching, embossing, printing, etc., could be performed on such articles at any desired predetermined intervals. The articles likewise could be formed of any material, such as metal or plastic.

It will be realized that any conventional devices, such as bushings, bearings, gears, chains, sprockets referred to in the specification are not part of the invention and that any desired means may be used in place of them as long as the functioning of the machine is not effected. Also, some of such conventional parts have not been specifically referred to in the description.

As the present invention covers parts of a complete, operative machine, as well as the entire machine, in some instances it may be desirable to use parts of the machine separately, or to add parts of the present machine to other machines to improve their functioning.

While in accord with the patent statutes, I have specifically illustrated and described one embodiment of my invention, it should be particularly understood that I am not to be limited thereto or thereby, but that the scope of my invention is defined in the appended claims.

The synchronizing device and the measuring device disclosed herein are being claimed in separate applications S. N. 709,577, now Patent No. 2,560,754, granted July 17, 1951, and 709,579, now Patent No. 2,530,796, granted November 21, 1950, filed concurrently herewith.

I claim:

1. An automatic function device for use in performing repetitive operations on a continuous article, which device comprises drive means, roller means for engaging with the article, a variable clutch directly connecting said drive means to said roller means and directly controlled by said roller means, said roller means rotating only with movement of the article, a cyclic measuring device, means connecting said measuring device to said adjustable clutch to be driven thereby by the rotation of said roller means, connecting and drive means actuated by said measuring device at predetermined adjustable intervals, carriage means driven by said connecting and drive means, and means carried by said carriage means for performing an operation on the article upon movement of said carriage means.

2. An automatic function device for use in performing repetitive operations on a continuous article, which device comprises master drive means, roller means for engaging with the article, an automatic adjustable clutch connecting said master drive means to said roller means, a cyclic measuring device, means connecting said measuring device to said adjustable clutch to be driven thereby when said roller means rotate, drive means controlled by said measuring device and actuated thereby at predetermined adjustable intervals, carriage means driven by said drive means, means carried by said carriage means for performing an operation on the article upon movement of said carriage means, and means for resetting said measuring device and said drive means for another cycle of operation.

3. An automatic function device for use in performing repetitive operations on a continuous article, which device comprises master drive means, roller means for engaging with the article but not constantly withdrawing power therefrom, said roller means moving in unison with an article engaged by the device, an adjustable clutch connecting said drive means directly to said roller means, a cyclic measuring device, means connecting said measuring device directly to said adjustable clutch to be driven thereby only when said roller means rotate and at a speed proportional to that of the article, connecting and drive means actuated by said measurging device at predetermined adjustable intervals, and means for performing an operation on the article when said connecting and drive means are actuated.

4. In apparatus for performing repetitive cyclic operations on a continuous, moving article, means for recording and measuring movement of the article, a frame, a carriage movably carried by said frame, means for driving said carriage through a cycle of movement on said frame on actuation by said recording and measuring means, operational means on said carriage for performing an operation on the article, control means associated with said last-named means, means on said frame for engaging with said control means to actuate said operational means on movement of said carriage through a cycle on said frame, and means for resetting said recording and measuring means as said carriage is moved through an operative cycle.

5. In apparatus for performing repetitive cyclic operations on a continuous, moving article, means for recording and measuring movement of the article, a frame, a carriage movably carried by said frame, means for driving said carriage through a cycle of movement on said frame on actuation by said recording and measuring means, operational means on said carriage for performing an operation on the article, an arm associated with said last-named means, means on said frame for engaging with said arm to actuate said operational means on movement of said carriage through a cycle on said frame, means for returning said operational means to its non-operative position after being moved to operative position, and means for resetting said recording and measuring means as said carriage is moved through an operative cycle.

6. In apparatus for performing repetitive cyclic operations on a continuous, moving article, means for recording and measuring movement of the article, a frame, a carriage movably carried by said frame, means connecting said carriage to said recording and measuring means which are adapted to drive said carriage through an operational cycle when a predetermined length of the article passes the apparatus, operational means on said carriage for performing an operation on the article, an arm associated with said last-named means, means on said frame for engaging with said arm to actuate said operational means on movement of said carriage through a cycle on said frame and to release said arm after actuating said operational means, means for returning said operational means to its non-operative position after being moved to operative position, and means for resetting said recording and measuring means as said carriage is moved through an operative cycle.

7. In combination, a frame, a carriage movably carried by said frame, a yoke plate secured to said carriage and having a vertically directed slot therein, a driven chain journalled on said frame and defining an orbit having a horizontal longitudinal axis adjacent said carriage, a roller engaged with said yoke, and means securing said roller to said chain on the transverse axis of and protruding laterally from the portion of said chain to which it is secured, said slot being equal in length to the vertical height of the orbit of said chain and being in width equal to the diameter of said roller, said roller being engaged with said slot to drive said carriage smoothly and positively through a repetitive cycle.

8. An automatic cut-off device for use in cutting equal length pieces from a continuous article that is moving along its longitudinal axis, which device comprises master drive means, a cyclic measuring device having a clutch therein and adapted to measure movement of the article, driven means controlled by said measuring device and actuated thereby at predetermined adjustable intervals, said driven means being driven by said master drive means, carriage means movable by said driven means through a reciprocating cycle, a saw carried by said carriage means, means for driving said saw, means movably positioning said saw for movement through the axis of the article to sever same when brought into contact therewith, means connecting between the said saw and said frame for moving said saw into and through the axis of the article with predetermined forward movement of said carriage on said frame, means for returning said saw to inoperative position after a cutting action, and means for resetting said clutch upon return movement of the carriage.

9. An automatic cut-off device for use in cutting equal length pieces from a continuous article that is moving along its longitudinal axis, which device comprises master drive means, roller means for engaging with the article, an automatic adjustable clutch connecting said master drive means to said roller means to drive same, a cyclic measuring device having a clutch therein, means connecting said measuring device to said adjustable clutch to be driven thereby when said roller means rotate, drive means controlled by said measuring device and actuated thereby at predetermined adjustable intervals, said drive means being driven by said master drive means, carriage means driven by said drive means through a reciprocating cycle, a saw carried by said carriage means, means movably positioning said saw for movement to and from the axis of the article to sever same when brought into contact therewith, means connecting between the said saw and said frame for moving said saw into the axis of the article with predetermined movement of said carriage on said frame, means for returning the said saw to inoperative position after a cutting action, and means for resetting said second clutch for another cycle of operation upon return movement of the carriage.

10. In a repetitive cyclic machine for performing operations upon a moving continuous article that moves along its longitudinal axis as it so moves, a frame, a carriage movably carried by said frame, means for reciprocating said carriage through a forward and return path on said frame, an operational device pivotally carried by said carriage, a link member carried by said operative device, and a track member pivotally positioned on said frame and inclined to the axis of said article and adapted to engage with said link member on only forward movement of said carriage, to move said operational device into the longitudinal axis of the article to perform an operation thereon.

11. In a machine as in claim 10, said track member being pivotally secured to said frame at a point sufficiently spaced from said operational device to cause same to be in the axis of the article at least at one instant when said link and track member are engaged, said link member moving the length of said track member with movement of said carriage and being released from engagement with said track member upon return movement of said carriage, and resilient means for urging said track member to a position for engagement with said link on forward movement of said carriage.

12. In a repetitive cyclic machine for severing lengths from a moving continuous article that moves along its longitudinal axis, a frame, a carriage movably carried by said frame, means for reciprocating said carriage through a forward and return path on said frame, a cyclic device for controlling the action of said carriage reciprocating means, a severing device pivotally carried by said carriage, an arm carried by said severing device, a roller journalled on said arm and positioned adjacent said frame, a track member pivotally positioned on said frame and adapted to engage said roller to bring said severing device into the axis of the article on forward movement of said carriage, means pivotally securing the lower end of said track member to said frame, and means resiliently urging said track member to an inclined position wherein said roller engages the lower surface of the upper end of said arm upon forward movement of said carriage to produce gradual movement of said severing device into the axis of the article and return movement of said carriage depresses said track member by said arm.

VALONE V. WEYANT.

REFERENCES CITED

The following references are of record in the file of this patent:

UNITED STATES PATENTS

| Number | Name | Date |
|---|---|---|
| 1,081,764 | Meyers | Dec. 16, 1913 |
| 1,219,935 | Gorton | Mar. 20, 1917 |
| 1,281,161 | Hochstein | Oct. 8, 1918 |
| 1,284,652 | Gorton | Nov. 12, 1918 |
| 1,936,331 | Lawson | Nov. 21, 1933 |
| 2,086,374 | Wikle | July 6, 1937 |
| 2,209,995 | Morris | Aug. 6, 1940 |

FOREIGN PATENTS

| Number | Country | Date |
|---|---|---|
| 140,440 | Great Britain | June 9, 1921 |
| 279,451 | Great Britain | of 1929 |